United States Patent
Shiro et al.

(10) Patent No.: US 6,644,554 B1
(45) Date of Patent: Nov. 11, 2003

(54) IC CARD

(75) Inventors: Teruaki Shiro, Tokyo-To (JP); Taichi Kaneko, Tokyo-To (JP); Eiji Hirosawa, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/590,169

(22) Filed: Jun. 9, 2000

(30) Foreign Application Priority Data

Jun. 11, 1999 (JP) .......................................... 11-164571

(51) Int. Cl.⁷ .............................................. G06K 19/06
(52) U.S. Cl. ...................... 235/492; 235/380; 235/379; 235/385; 235/487; 705/14; 705/17
(58) Field of Search ................. 235/492, 487, 235/380, 379, 385; 705/14, 17

(56) References Cited

U.S. PATENT DOCUMENTS

| | | | | |
|---|---|---|---|---|
| 5,397,883 A | * | 3/1995 | Miyashita | 235/382 |
| 5,559,312 A | * | 9/1996 | Lucero | 235/380 |
| 5,793,027 A | * | 8/1998 | Baik | 235/375 |
| 5,806,045 A | * | 9/1998 | Biorge et al. | 705/14 |
| 5,845,069 A | * | 12/1998 | Tanaka | 705/18 |
| 5,892,211 A | * | 4/1999 | Davis et al. | 235/375 |
| 5,901,303 A | * | 5/1999 | Chew | 711/115 |
| 6,112,987 A | * | 9/2000 | Lambert et al. | 235/380 |
| 6,138,911 A | * | 10/2000 | Fredregill et al. | 235/380 |
| 6,222,914 B1 | * | 4/2001 | McMullin | 379/144.01 |
| 6,443,362 B1 | * | 9/2002 | Methlouthi | 235/487 |
| 6,467,691 B1 | * | 10/2002 | Green | 235/487 |

FOREIGN PATENT DOCUMENTS

JP         411007507 A   *   1/1999

* cited by examiner

Primary Examiner—Michael G. Lee
Assistant Examiner—Allyson Sanders
(74) Attorney, Agent, or Firm—Parkhurst & Wendel, L.L.P.

(57) ABSTRACT

A use information judging means compares use information recorded in use information recording means with a predetermined condition value to judge whether or not the use information agrees with the predetermined condition value. When the use information judges that the use information agrees with the condition value, rewriting means rewrites content information stored in content information storing means. The use information can include an accumulated used amount of money or use times. The content information can include a royalty service rate, a premium rate or a limit of usable amount of money.

8 Claims, 2 Drawing Sheets

IC CARD

TECHNICAL FIELD OF THE INVENTION

The present invention relates to an IC card, more specifically to an IC card which can rewrite content information stored in the IC card.

PRIOR ART

As regards rewriting content information of an IC card, Japanese Patent Laid-Open Publication No 193399 describes that a date is automatically rewritten based on a date signal, and a limit of a monthly usable amount of money (content information) of a credit card is returned to the limited amount when a rewriting date has passed. Japanese Patent Laid-Open Publication No. 204484/1997 describes that a plurality of regions are provided in an IC card to store electronic money information, royalty service information and service content information to thereby provide premium service. Japanese Patent Laid-Open Publication No. 204484/1997 describes a method for using an IC card for a game apparatus, in which various content information of the IC card is rewritten under various conditions.

However, in Japanese Patent Laid-Open Publication No. 193399/1991, the rewriting is performed, only based on a date signal (a clock circuit), whereby the rewriting cannot be performed based on parameters other than the date signal. Furthermore, the limit of a usable money amount is simply returned to its initial amount and cannot be increased. In Japanese Patent Laid-Open Publication No. 203383/1997, a royalty service rate and a premium rate are fixed, whereby customers whose use frequency of their IC cards is higher, and customers whose use frequency of their IC cards cannot be discriminated from each other. In Japanese Patent Laid-Open Publication No. 332281/1997, data of the IC card are not rewritten.

DISCLOSURE OF THE INVENTION

The present invention has been made to solve the above-described problems. An object of the present invention is to provide an IC card which can have a variety of rewriting conditions and rewritten contents, to thereby provide fine services suitable to individual customers.

The present invention is an IC card comprising use information recording means for recording use information of an IC card, content information storage means for storing content information of the IC card, use information judging means for comparing the use information of the IC card recorded by the use information recording means with a predetermined condition value of use information, and judging whether the recorded use information of the IC card agrees with the predetermined condition value, and rewriting means for rewriting the content information stored in the content information storage means when the use information judging means judges that the recorded use information of the IC card agrees with the determined condition value.

According to the present invention, the use information judging means judges whether or not use information agrees with a predetermined condition value, and when the use information judging means judges that the use information agrees with the predetermined condition value, the rewriting means rewrites the content information stored in the content information storing means. Accordingly, there is no restriction by rewriting conditions or rewritten contents, so that suitable services can be provided to individual customers.

The IC card according to the present invention is one that is adaptable to multi-applications, and the use information judging means and the rewriting means comprises additional corresponding applications.

According to the present invention, applications are added to the IC card which is adaptable to multi-applications to thereby compose the use information judging means and the rewriting means. Accordingly, the IC card can be easily produced by without correcting the operating system.

In the IC card according to the present invention, the use information recorded in the use information recording means is an accumulated used amount of money.

According to the present invention, when the accumulated used amount of money agrees with the predetermined accumulated used amount of money, the content information is rewritten. The predetermined used amount of money is provided in the application incorporated in the IC card, as one parameter of the application.

In the IC card according to the present invention, the use information recorded in the use information recording means is accumulated use times.

According to the present invention, when the use times agree with predetermined use times, the content information is rewritten. The predetermined accumulated use times is provided in the application incorporated in the IC card, as one parameter of the application.

In the IC card according to the present invention, the content information stored in the content information storing means is a royalty service rate.

According to the present invention, when the use information agrees with the predetermined condition value, the royalty service rate is automatically rewritten.

In the IC card according to the present invention, the content information stored in the content information storing means is a premium rate.

According to the present invention, when the use information agrees with the predetermined condition value, the premium rate is automatically rewritten.

In the IC card according to the present invention, the content information stored in the content information storing means is a limit of usable amount of money.

According to the present invention, when the use information agrees with the predetermined condition value, the limit of usable amount of money is automatically rewritten.

The IC card according to the present invention is one that is used in a game apparatus, and the content information stored in content information storing means is ability data for the game apparatus.

According to the present invention, when the use information agrees with the predetermined condition value, the ability data for the game apparatus is rewritten.

BEST MODES FOR MODE FOR CARRYING OUT THE PRESENT INVENTION

Figure 1A:
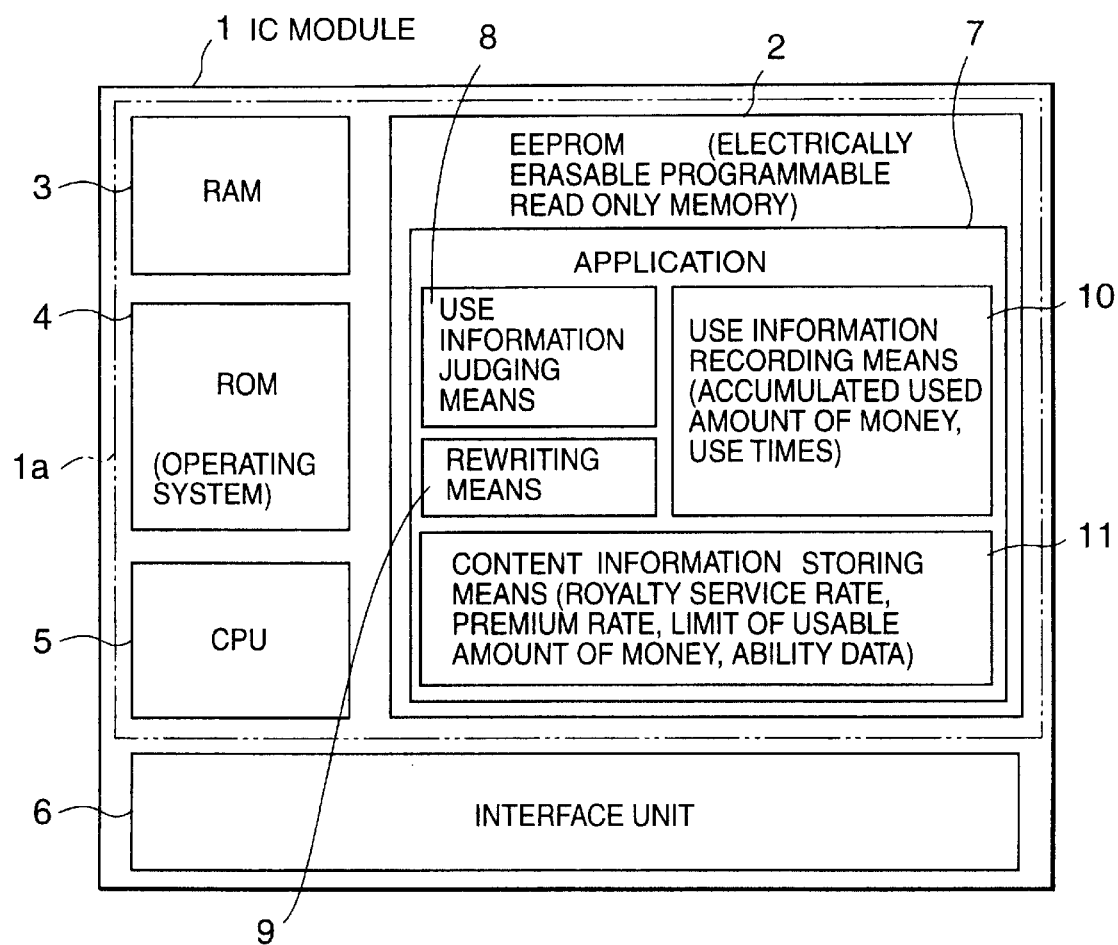
FIG. 1A is a view of an IC module constituting an IC card according to the present invention.

Next, the present invention will be explained by means of a mode in which the present invention is practiced. A constitution of one example of the IC card according to the present invention will be explained with reference to FIGS. 1A and 1B. An IC module 1 comprises a RAM (random access memory) 3, a ROM (read only memory) (operation system) 4, a CPU (central processing unit) 5, an interface unit 6, use information judging means 8, rewriting means 9, use information recording means 10 and content information recording means 11. The use information judging means 8, the rewriting means 9, the use information recording means 10 and the content information storing means 11 constitute an application 7. The application 7 is built in an EEPROM (electrically erasable programmable read only memory) 2 of the module 1.

The use information judging means 8, the rewriting means 9, the use information recording means 10 and the content information storing means 11 may be incorporated in the ROM 4 in accordance with the type of the IC card 20.

Figure 1B:
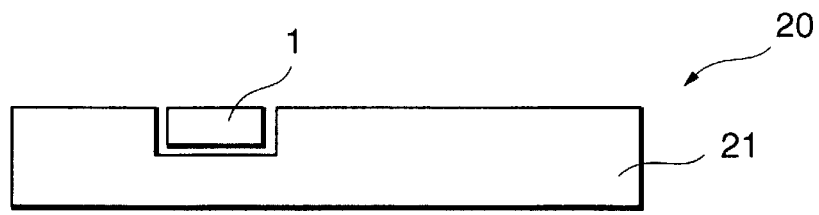
FIG. 1B is a side view of the IC card according to the present invention.

An IC card 20 generally comprises a substrate portion 21 formed of multi-layers of plastic sheets, such as vinyl chloride sheets or the like, and the IC module 1 buried in the substrate 21 (FIG. 1B). The IC module 1 comprises a unit of an. IC (integrated circuit) chip 1a for storing and processing data, and the interface unit 6 which performs contact-type or non-contact type data communication, which are electrically aggregated with each other. The IC module characteristics of which have been checked is buried in the finished substrate 21, and the IC card 20 can have high product yields, good qualities and reliability.

The IC module 1 is constituted by hardware, such as a one-chip microcomputer or others, and software such as an OS (an operating system for operating the hardware), application programs, etc. That is, the IC module is a minute scale computer system.

The use information judging means 8 compares use information of the IC card 20 with a predetermined condition value to judge whether or not the use information agrees with the condition value. The rewriting means 9 rewrites content information (data and/or contents of data processing) of the content information storing means 11 when the use information judging means 8 judges that the use information agrees with the condition value. The use information judging means 8 and the rewriting means 9 are formed as one function of an application program of the IC card 20 (or the IC module 1). As in the example shown in FIG. 1A, in the present invention, an application program is stored in the EEPROM 2 of the IC module. In the present invention, because the use information recording means 10 and the content information storing means 11 store respective information, the EEPROM 2, which is electrically rewritable, is suitable as the memory means.

The use information recording means 10 accumulates and records the use information of the IC card 20, such as an accumulated amount of used money, an accumulated use times, etc. The content information storing means 11 stores the content information of the IC card 20, e.g., a royalty service rate, a premium rate, a limit of usable amount of money, ability data, etc. In a case that the accumulated used amount of money is recorded in the use information recording means 10, when the use information judging means 8 judges that an accumulated used amount of money agrees with a predetermined accumulated amount of money, the rewriting means 9 rewrites the content information of the content information storing means 11. In a case that the use information recording means 10 records the accumulated use times, when the accumulated use times agree with a predetermined use times, the rewriting means 9 rewrites the content information of the content information recording means 11.

In a case that a royalty service rate is stored in the content information recording means 11, when the use information judging means 8 judges that the use information, such as the accumulated used amount of money or others, agrees with the predetermined condition, the rewriting means 9 rewrites the royalty service rate of the content information storing means 11. In a case that the premium rate is stored in the content information storing means 11, when the use information judging means 8 judges that the use information use information agrees with the prescribed condition, the rewriting means 9 rewrites the premium rate of the content information storing means 11. In a case that the limit of usable amount of money is stored in the content information storing means 11, when the use information judging means 8 judges that the use information agrees with the predetermined condition, the rewriting means 9 rewrites the limit of usable amount of money of the content information storing means 11. In a case that ability data for a game apparatus is stored in the content information storing means 11, when the use information judging means 8 judges that the use information agrees with the predetermined condition, the rewriting means 9 rewrites the ability data of the content information storing means 11. The rewriting of the ability data is suitable for the IC card 20 used in a game apparatus. The ability data are, e.g., physical ability, etc. of a hero of a game appearing in the game apparatus.

The interface unit 6 performs communication control. electric level conversion, etc. for data communication with external apparatuses (e.g., reader/writers). In a case that the IC card 20 is of the contact-type, the interface unit 6 is electrically connected to the external apparatus with an electrode terminal. In a case that the IC card 20 is of the non-contact- type, the interface unit 6 is electrically contacted to an external apparatus by a coil or a loop antenna.

Then, the operation of the IC card according to the present invention will be explained. In the present invention, usage purposes of the IC card 20 are not specifically limited. For easy understanding, the operation of the IC card 20 will be explained by means of the royalty service which is one example of uses of the IC card 20. An application corresponding to the royalty service is added to the primary application 7 of the IC card 20, whereby the royalty service can be accomplished by the IC card 20. The operating system (OS) 4 for the IC card in such case is suitably an operating system, specifically "MULTOS" or "OS having a Java card technology", that is adaptable to multi-applications. "MULTOS" is a universal OS for multi-application IC cards promoted by MAOSCO Consortium run by MXI (Mondex International), MasterCard International, etc. "Java card OS" is an program language developed by SUN MICRO SYSTEM, and a card OS having Java Card API (Application Programming Interface).

Usually, the IC card 20 is carried on its owner. When the owner buys an article at a shop, he hands the IC card 20 to a salesclerk. The salesclerk received the IC card 20 and loads the IC card 20 to the reader/writer (not shown). The reader/writer and a register are terminal devices of a sales system of the shop. Information contained in the IC card 20, and information involved in buying the article and generated by the register are centralized to be administered. Every time the owner uses the IC card 20 to buy articles, use information is accumulated (an accumulated used amount of money, accumulated use times, etc.) in the use information recording means 10.

It is possible that the sales system may have the constitution of the IC card 20 exemplified in FIGS. 1A and 1B. In the present invention, however, the IC card itself has a constitution of such sales system. According to the present invention, the processing minimizes the burden on the sales system while providing individual customers with suitable services. The use information judging means 8 of the IC card 20 monitors the use information recorded in the use information recording means 10 (MONITOR). The monitoring may be continuously performed, but the use information judging means 8 starts the monitor (START) when the IC card 20 is loaded on the reader/writer or when new use information (an accumulated used amount of money, etc.) is recorded in the use information recording means 10. The monitoring of the use information judging means 8 is finished (END) when the IC card 20 is unloaded from the reader/writer or when content information (a royalty service rate, etc.) stored in the content information storing means 11 is rewritten.

Figure 2:
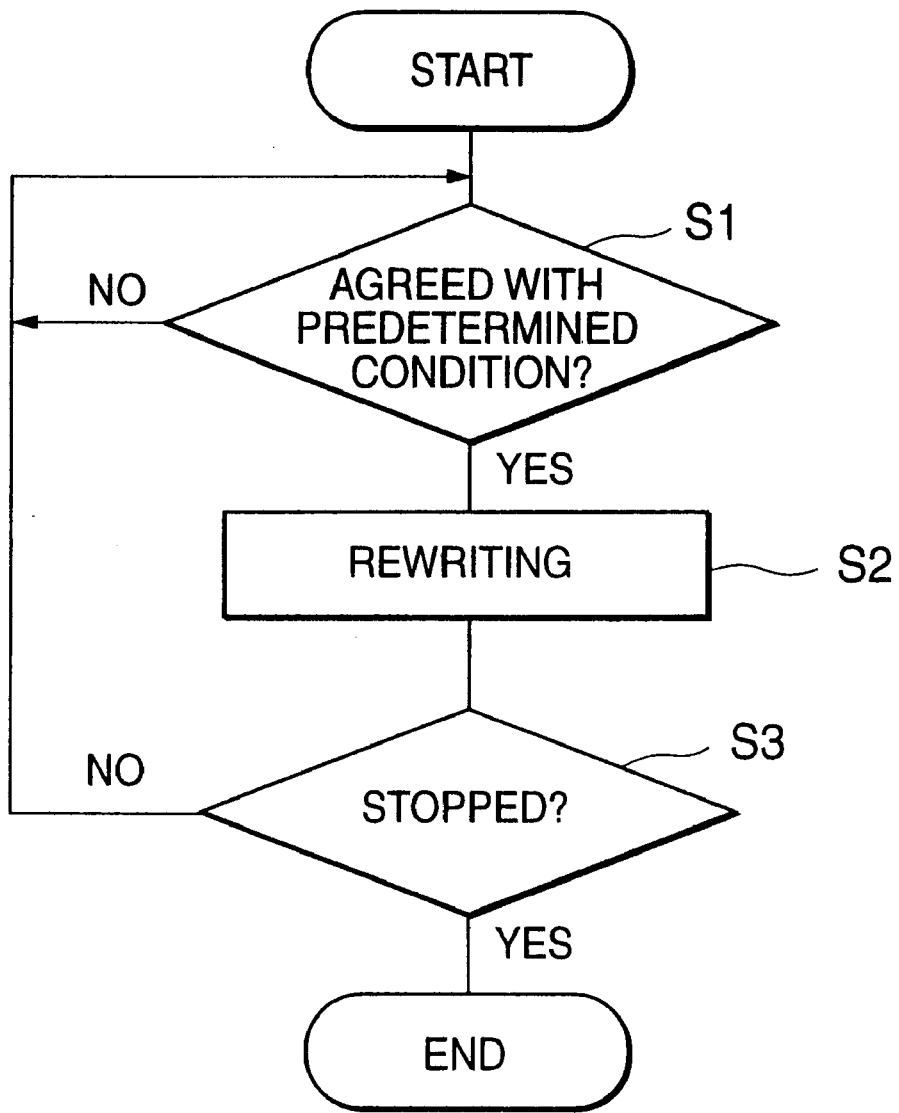
FIG. 2 is a flow chart of steps of processing by the IC card according to the present invention.

The processing by the IC card 20 according to the present invention is shown by the flow chart in FIG. 2. In Step S1 of FIG. 2, the use information judging means 8 judges whether or not the use information (accumulated used amount of money, etc.) recorded in the use information recording means 10 agrees with the predetermined condition value. When not agreed, a stand-by state continues until the use information agreed with the predetermined condition value. When the use information judging means 8 judges that the use information is agreed, Step S2 follows.

In Step S2, the rewriting means 9 rewrites content information (a royalty service rate, etc.) stored in the content information storing means 11. Next, in Step S3, it is judged with reference to a state of the IC card 20 (e.g., loaded one, or unloaded one) whether the processing is stopped or continued. When the processing is continued, the processing is returned to Step S1 to repeat the following processing steps. On the other hand, when the processing is ended, the processing is stopped.

For example, in a case that use information recorded in use information recording means 10 is the accumulated used amount of money, and the content information stored in the content information storing means 11 is a royalty service rate, it is possible that 1% is added to a royalty service rate of 10% when the accumulated used amount of money exceeds ¥100,000, and the royalty service rate is automatically rewritten to be 11%. Such rewriting of the content information can make the royalty service rate of 11% applicable to a used amount of money of a next purchase or a part of a used amount of money of the present purchase which exceeds ¥100,000, and the application 7 gives a point, based on the used amount of money or the part of the used amount of money and the royalty service rate.

As described above, according to the present invention, rewriting conditions and rewritten contents are not restricted. Accordingly suitable services can be provided to individual customers.

The IC card according to the present invention can be easily formed with retaining the primary application of the IC card as it is.

The content information can be rewritten when the accumulated amount of money agrees with the predetermined accumulated amount of money.

The content information can be rewritten when the accumulated use times agree with the predetermined use times.

The royalty service rate can be rewritten when the use information agrees with the predetermined condition.

The premium rate can be rewritten when the use information agrees with the predetermined condition.

The limit of usable amount of money can be rewritten when the use information greed with the prescribed condition.

The ability data can be rewritten when the use information agrees with the predetermined condition.

What is claimed is:

1. An IC card comprising:

use information recording means for recording use information of an IC card;

content information storage means for storing content information of the IC card;

use information judging means for comparing the use information of the IC card recorded by the use information recording means with a predetermined condition value of use information, and judging whether the recorded use information of the IC card agrees with the predetermined condition value; and rewriting means for rewriting the content information stored in the content information storage means when the use information judging means judges that the recorded use information of the IC card agrees with the determined condition value.

2. An IC card according to claim 1, wherein the IC card is adaptable to multi-applications, and the use information judging means and the rewriting means comprise additional corresponding applications.

3. An IC card according to claim 1, wherein the use information recorded in the use information recording means comprises an accumulated used amount of money.

4. An IC card according to claim 1, wherein the use information recorded in the use information recording means comprises accumulated use times.

5. An IC card according to claim 1, wherein the content information stored in the content information storing means comprises a royalty service rate.

6. An IC card according to claim 1, wherein the content information stored in the content information storing means comprises a premium rate.

7. An IC card according to claim 1, wherein the content information stored in the content information storing means comprises a limit of usable amount of money.

8. An IC card according to claim 1, wherein the IC card is for use in a game apparatus; and the content information stored in the content information storing means comprises ability data for a game apparatus.

* * * * *